United States Patent [19]

Rock

[11] Patent Number: 4,726,500
[45] Date of Patent: Feb. 23, 1988

[54] GLASS SCORING MACHINES

[76] Inventor: Robert E. Rock, 225 S.W. 15th St., Dania, Fla. 33004

[21] Appl. No.: 894,842

[22] Filed: Aug. 8, 1986

Related U.S. Application Data

[63] Continuation-in-part of Ser. No. 687,769, Dec. 31, 1984, abandoned.

[51] Int. Cl.$^4$ .................. B26D 3/08; B26F 3/00
[52] U.S. Cl. .................... 225/96.5; 83/886; 83/902
[58] Field of Search ............... 83/879–886, 83/902; 30/164.95; 33/32 D, 32 E, 32 G; 198/688; 206/454; 225/96, 96.5, 103

[56] References Cited

U.S. PATENT DOCUMENTS

| | | | |
|---|---|---|---|
| 1,728,734 | 9/1929 | Klein | 83/902 X |
| 1,836,393 | 12/1931 | Reece | 225/96.5 |
| 2,472,862 | 6/1949 | Sigoda | 83/902 X |
| 2,621,618 | 12/1952 | Taylor | 83/902 X |
| 3,157,329 | 11/1964 | De Gorter | 225/96 X |
| 3,169,683 | 12/1965 | Pierce | 225/103 X |
| 4,222,300 | 9/1980 | El-Habr | 83/564 X |
| 4,385,540 | 5/1983 | Dieter | 83/886 |

*Primary Examiner*—E. R. Kazenske
*Assistant Examiner*—Eugenia A. Jones
*Attorney, Agent, or Firm*—Alvin S. Blum

[57] ABSTRACT

Glass scoring machines for breaking glass along the lines of intricate patterns employing an intermittent feed dog glass advancing mechanism beneath the glass and a spring loaded glass scoring tool supported above the glass. Optionally includes a tapping device for periodically striking the scored glass to facilitate subsequent breaking along the scored line. May also be practiced as a sewing machine attachment for scoring or cutting glass or like material by selectively utilizing sewing machine mechanism without adversely affecting the normal operation of the sewing machine upon removal of the attachment.

16 Claims, 8 Drawing Figures

GLASS SCORING MACHINES

This is a continuation in part of application Ser. No. 06/687,769 filed 12/31/84, abandoned.

BACKGROUND OF THE INVENTION

Field of the Invention

This invention relates to glass scoring machines for scoring glass along intricate pattern lines, including intermittent feed dog means beneath the glass, glass scoring means supported upon the glass to be scored, and optional tapping means to periodically tap the just-scored glass to facilitate breakage along the scored lines.

At the present time there is a resurgence in the fields of stained and art glass work, and many people that may have little or no previous experience with the use of glass cutters are interested in accomplishing projects in the flat glass medium. The techniques employed by artisans that are familiar with the use of conventional type glass cutters are not easily developed, and, accordingly, inexperienced workers have difficulty in cutting glass to provide the intricate shapes that may be required. When the sheets of glass being used have a mottled or irregular surface, the problem is greater. In most all prior art glass cutting apparatus, a cutter or stylus is moved across the face of the glass that is to be scored. Hand tools previously used and provided are likewise intended and primarily adapted for use in keeping with this conventional cutting procedure.

The prior art teaches utilization of machines constructed and arranged for applying glass cutters at different pressures for different glass thicknesses and hardness for assuring an improved score with resultant better, cleaner break and less chipping, thereby requiring little effort on the part of the operator when cutting glass. None of these teach the intermittent feed dog for advancing the glass past the cutter for following intricate pattern lines.

The prior art also discloses cutters in combination with sewing machines having intermittent feed dog means, but these cutters are motor driven reciprocating blades or motor driven rotary blades for shearing through fabric and inapplicable to scoring glass because reciprocating cutters would fracture the glass and power rotating cutters would dull promptly without a coolant fluid stream.

SUMMARY OF THE INVENTION

The primary object of the invention is a machine for scoring flat glass along intricate pattern lines including a flat workpiece support table, a cantilevered glass cuttersupport arm attached to the table, an aperture in the table directly beneath the glass cutter, and an intermittent feed dog mechanism beneath the table powering a feed dog which rises up through the aperture to lift the workpiece slightly above the surface of the table and then advance the workpiece a very short distance. The dog is then retracted below the level of the table surface so that it no longer contacts the workpiece and is then moved back to its starting position. This motion is repeated rapidly under power of a variable-speed, reversible motor. The net effect is to advance the glass in a series of very short, straight lines beneath the glass scoring tool. Although each advance is a straight line, the feed dog mechanism, when applied to curved lines in patterns, is found to produce very nicely curved lines due to the very short length of each individual advance. Furthermore, the intermittent nature of the feeding of the workpiece and the periodic lifting of the workpiece off the table on a point directly beneath the glass cutter provides a pivot action free of the friction of the table to enable the user to guide the workpiece so that the cutter exactly follows the pattern lines. The cutter support arm includes adjustable spring biasing to apply the cutter to the glass with controlled force. The cutter support arm further includes a control to hold the cutter high enough above the glass in a first, loading position to facilitate loading the workpiece without interference from the cutter. The control also holds the cutter against the workpiece with spring bias in a second, operating position.

The glass scoring means may be a sharp point of a hard material such as diamond, or a hard, sharp, small diameter wheel such as is well known in the art. The wheel rotates freely on an axis and is rotated by the movement of the glass against it. It is always of a radius less than the usual thickness of glass to enable effective scoring. This is in contrast to the large diameter diamond wheels which are power rotated at high speed for cutting, not scoring glass. These require a continuous flow of coolant and cannot be used in this application, because the coolant obscures the pattern lines.

Other support means may be employed to hold the glass cutter above the workpiece such as a ceiling mount.

An alternative embodiment of the invention is in an attachment for a conventional sewing machine which permits its utilization as a machine for scoring glass, for those sewing machines having an intermittent feed dog means.

A further object of the invention is in an attachment which may be manually removed from a sewing machine with minimal effort thereby selectively permitting use of the sewing machine mechanism either for scoring or cutting glass or for sewing of fabrics.

A still further object of the invention is in the utilization of a sewing machine defective for sewing purposes but which includes an operative feed dog, thereby being readily adaptable and operable with the attachment for scoring or cutting glass.

A further object of the invention obviates use of higher cost glass cutting machines per se.

A yet additional object of the invention is in the use of any conventional sewing machine easily adaptable to receiving the attachment thereby permitting scoring or cutting glass in addition to its primary function as a sewing machine.

Another object of this invention is in effecting greater working speed without sacrifice of accuracy.

Still another object of the invention permits use of the sewing machine by inexperienced glaziers without fear of danger by glass breakage or of being accidentally cut by the scoring or cutting tool.

Still other objects of the invention will be readily apparent to those skilled in the art in light of the following detailed description of the invention.

DETAILED DESCRIPTION OF THE INVENTION

Figure 1:
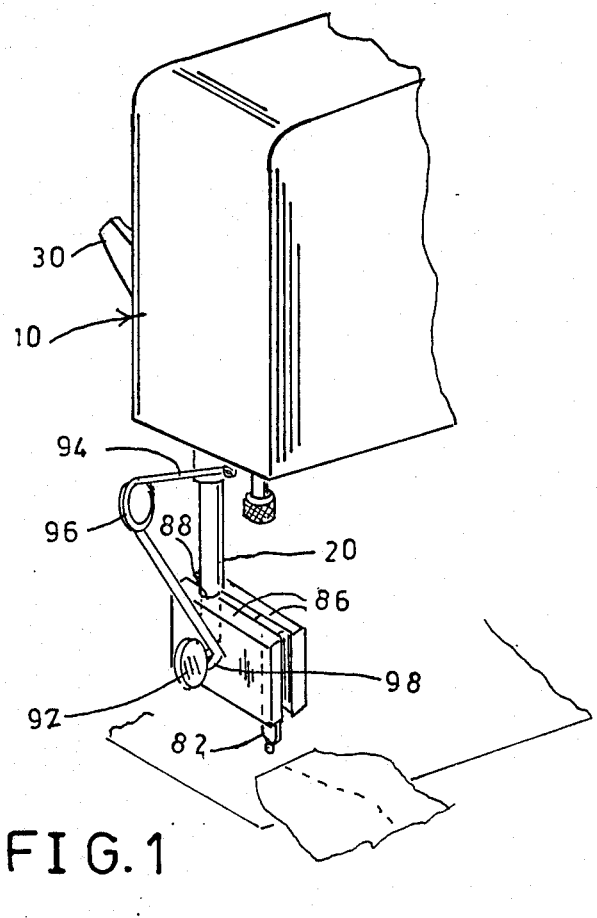
FIG. 1 illustrates a conventional sewing machine including one embodiment of a glass scoring or cutting attachment.
Figure 2:
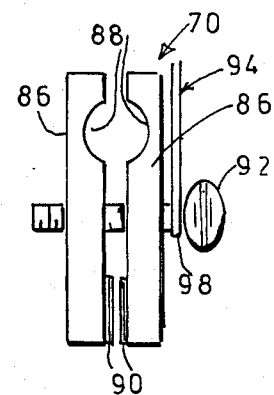
FIG. 2 illustrates an enlarged detailed view of the glass scoring or cutting attachment of FIG. 1.
Figure 3:
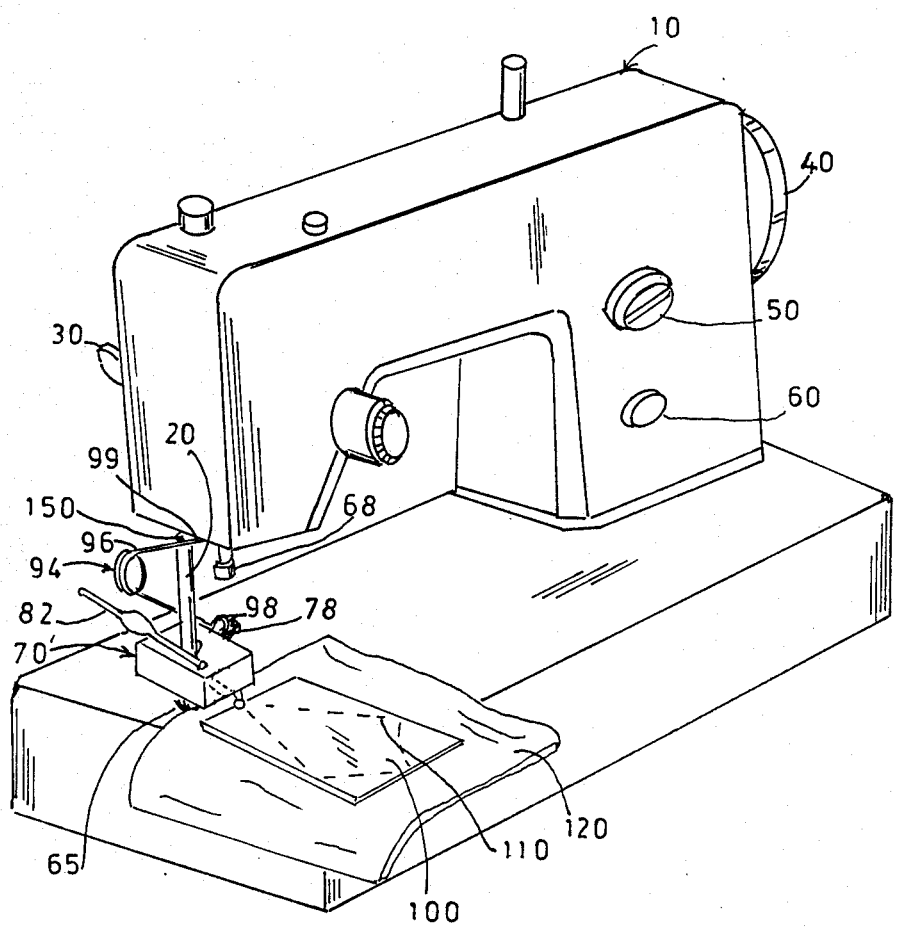
FIG. 3 illustrates a view similar to FIG. 1 including a second embodiment of a glass scoring or cutting attachment.

Referring to the figures of the drawing, FIGS. 1 and 3 illustrate a conventional sewing machine 10 including a presser bar 20, a presser bar lifter 30, a hand wheel 40, a stitch length regulator 50, and a forward-reverse control 60. Attached to presser bar 20 is the glass scoring or cutting attachment of the invention as illustrates in FIGS. 2 and 4.

FIG. 2 illustrates one embodiment of a holder 70 for a scoring or cutting tool and includes a pair of similar plates 86 having opposed complementary recesses 88 constructed to engage and receive the presser bar 20, the opposite ends or sides of the plates 86 include on the inner surfaces thereof opposed rubberized or similar material layers 90. A scoring or cutting tool (not shown) is retained between the plates 86 by a thumb screw 92 or like means.

Figure 4:
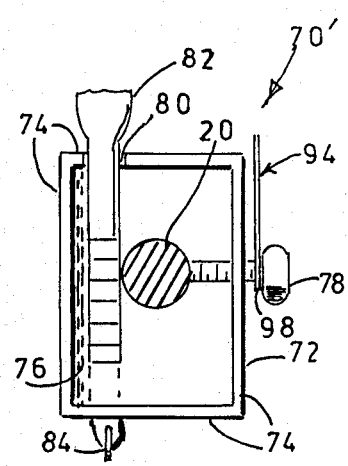
FIG. 4 illustrates an enlarged detailed view of the glass scoring or cutting attachment of FIG. 3.

FIG. 4 illustrates an enlarged perspective view of a second embodiment of an attachment. The attachment 70' includes a hollow glass scoring or cutting tool mount or support 72 having four sides 74, one of the sides includes a rubberized or similar cushioning member 76 secured to the inner wall thereof and the side opposed to said one side includes one or more threaded thumb screws 78 or like means for engaging the presser bar 20. One of the sides 74 include a notch or recess 80 for accomodating or receiving a conventional glass scoring or cutting tool 82 and which includes a conventional scoring or cutting rotatable wheel 84 at one end thereof. As illustrated in this figure, the end of the thumb screw bears against the presser bar 20 which bar bears against the glass cutter 82 bearing against rubberized layer 76 thereby frictionally retaining the glass scorer or cutter against the presser bar.

Figure 5:
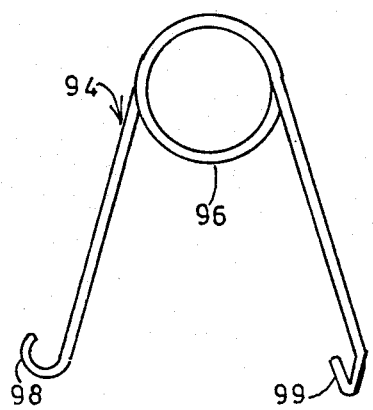
FIG. 5 illustrates a spring wire usable in conjunction with the glass scoring attachment.

FIG. 5 illustrates a pressure spring 94 having a plurality of coils 96 of sufficient number to provide a pressure sufficient to urge the glass scoring or cutting instrument against the glass to effect scoring or cutting of the glass but insufficient to impair or affect the movement of the feed dogs for moving the glass during the scoring or cutting operation. Spring 94 includes hook ends 98, 99, one hook 98 constructed to frictionally and fixedly engage the glass scoring or cutting tool holder thumb screws 78 or 92 and the other hook end 99 engaging the underside of the sewing machine housing at 150 and around the presser bar.

Figure 6:
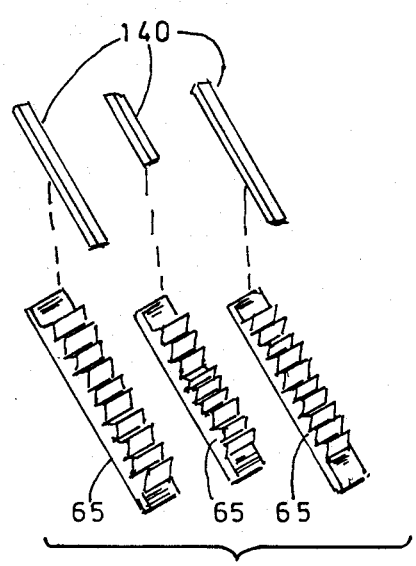
FIG. 6 illustrates rubberized or like material feed dog strips adapted for application to existing non-rubberized feed dogs.

FIG. 6 illustrates rubberized feed dog strips 140 applied to existing non-rubberized feed dogs 65, e.g. metal feed dogs which are not composed of a rubberized material.

The sewing machines adaptable to this invention are those having feed dogs of the type in which the feed dog mechanism is beneath the workpiece table, and the feed dog repetitively proceeds through the following cycle: The dog rises from beneath the table, through an aperture in the table to a point slightly above the table surface, raising the glass upon the dog. The dog advances in a first direction parallel to the table surface, feeding the raised glass a short distance (the stitch length). The dog then retracts below the table surface. The dog then returns in the second direction parallel to the table to its starting position. Because the dog is below the table in this motion, it does not return the glass to its starting position. This feed dog mechanism is well known in the mechanical arts and is especially useful in sewing machines, and in the instant invention for scoring glass along intricate pattern lines.

Figure 7:
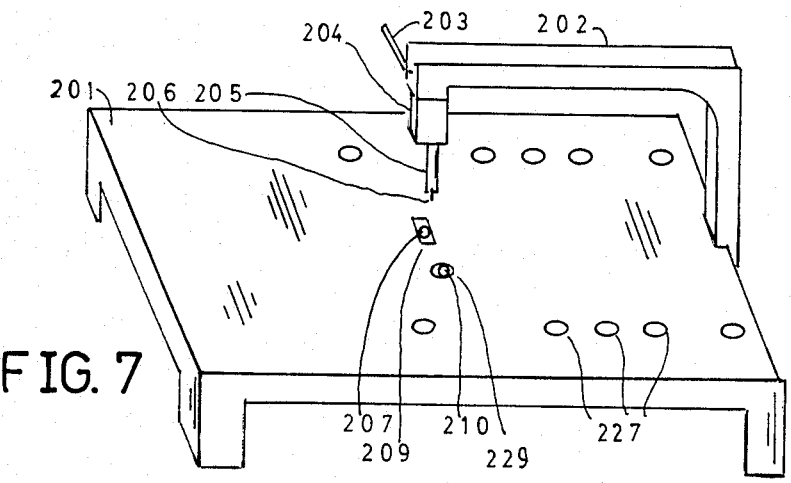
FIG. 7 illustrates a perspective view of an embodiment of the invention.
Figure 8:
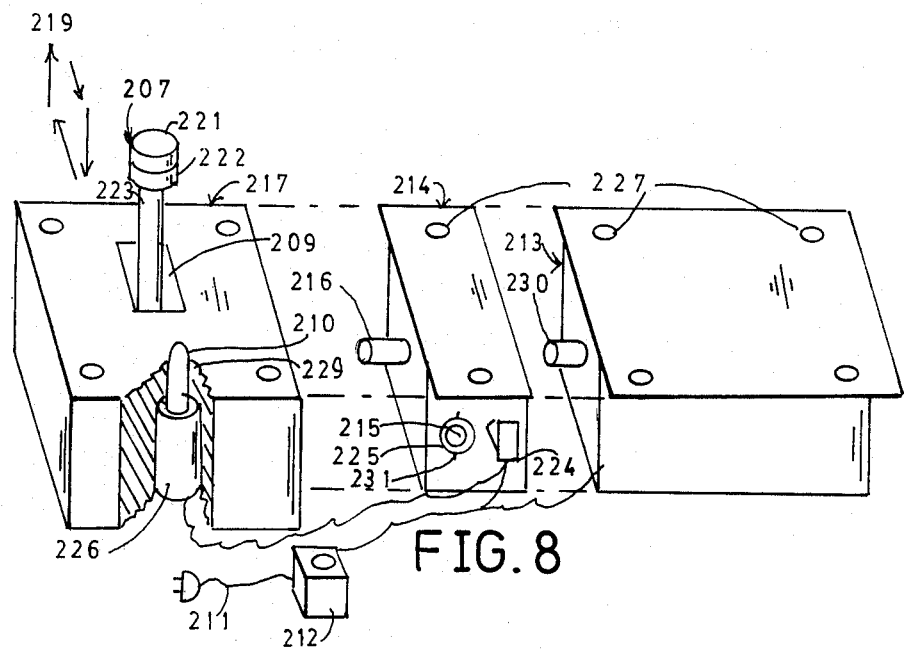
FIG. 8 illustrates an exploded view of the mechanisms beneath the table of FIG. 7.

Referring now to FIGS. 7 and 8, illustrating a machine of the invention made specifically for this application, rather than an adaptation of a sewing machine. A flat-topped table 201, adapted for supporting the glass to be scored, supports a presser bar 204 on a cantilevered support arm 202. The presser bar 204 holds a glass scoring tool 205 having a small-diameter hard wheel 206 of the type well known in the glass scoring art. Presser bar lifter 203 lifts the tool clear of the workpiece in a loading position. It presses the tool against the workpiece with an adjustable spring bias in an operating position. Aperture 209 in table 201 permits feed dog 207 to periodically rise up above the table surface and lift and advance the glass and then retract below the surface and return to its original location. Mounted below the table 201 by mounting holes 227 is the electrically powered mechanism shown in exploded view in FIG. 8. Power cord 211 powers a foot-operated speed control 212 which powers variable speed reversible drive motor 213, whose output shaft is connected to the input of speed reducer 214, which has a first output shaft 215 which drives a disc 225 with switch contacts 231. These actuate switch 224 which actuates solenoid coil 216 which drives tapper rod 210 upwards through tapper aperture 229 in table 201. A second output shaft 216 of speed reducer 214 rotates at one tenth of the rate of the first output shaft 215. This shaft 216 is connected to two-direction translational drive 217 which drives feed dog 207 through its orbital motion as indicated by the directional arrows 219. This type of converter of rotational motion to intermittent, up and down and to and fro motion is well known in the mechanical arts especially as exemplified by the sewing machine feed dog mechanisms. In FIG. 8, a portion of the converter 217 is broken away to reveal a solenoid tapper mechanism. The tapper will strike the glass every fifth advance if two switch points 231 are extended on disc 225. By changing the number of points, one can change the frequency of tapping relative to advances of the glass. Tapping the glass immediately after scoring in a controlled manner and right at the scoring line facilitates breaking the glass along the scored line. The feed dog 207 has a glass-engaging frictional surface pad 221 and a rotary top 222 rotating on a shaft 223 with ball bearings to enhance the pivoting upon the raised dog as the user maneuvers the advancing glass to follow the pattern lines.

Operation of the Sewing Machine Embodiments

Firstly, rubber or similar strip material 140 as shown in FIG. 6 are adhesively or otherwise secured to existing feed dogs 65 where the feed dogs are fabricated of non-rubberized material, e.g. metal feed dogs.

Alternatively, vinylized cloth 120 or similar material may underlie the piece of glass and functions similarly to strips 140 and obviates the use thereof as well as because of its frictional surface inhibits undersirable movment of the glass during the scoring or cutting operation.

Secondly, the sewing machine needle and presser foot of the sewing machine are removed and the needle bar 68 is optionally disengaged from the motive action. No disengagement of needle bar 68 is required where the lower-most downward movement of the needle bar doesn't interfere with the movement of the cutting tool mount or attachments 70, 70'.

Thirdly, one of the cutting tool mounts 70 or 70', together with the scoring or cutting instrument 82 are secured to presser bar 20, the instrument being so arranged within the mount that upon lowering of the bar 20 by lever 30, scoring or cutting wheel 84 is positioned to contact a piece of glass 100 having thereon a pattern 110.

Fourthly, spring 94 can optionally be utilized as aforesaid for applying additional pressure to the scoring or cutting wheel in contact with a piece of glass in addition to the usual existing spring bias on the presser foot bar where such existing spring bias is insufficient to urge the scoring or cutting instrument into contact with the glass with a pressure sufficient to effect scoring or cutting of the glass surface.

Fifthly, the operator operates the sewing machine with the attachment similarly to normal operation of the sewing machine thereby resulting in feeding of the glass sheet under the scoring or cutting wheel thereby resulting in scoring or cutting the piece of glass similar to straight stitch sewing of fabric. The direction of the glass scorer or cutter can be instantly reversed by the forward-reverse control 60 as can the scoring-cutting speed be regulated by the machine's stitch length control 50 or by regulation of the machine's source of power.

The glass scoring or cutting tool 82 is given by way of example. Obviously, other scoring or cutting tools could be utilized in lieu of the glass scoring or cutting tool as described herein without affecting the advantages obtained by the invention. Similarly, other materials can be scored or cut by the glass scoring or cutting tool or similar scoring or cutting tool or instrument.

It is evident from the above disclosures that other modifications are within the scope thereof without departing from the spirit of the invention or sacrificing the principle advantages set forth herein.

What is claimed is:

1. A removable attachment for converting a sewing machine of the type having a presser bar and movable feed dog means into a glass scoring machine for scoring glass along predetermined pattern lines, said attachment for attaching to said presser bar at the end proximate to said feed dog means, said attachment comprising: presser bar attaching means and glass scoring means attached to said presser bar attaching means, for positioning said glass scoring means against the upper surface of a vitreous workpiece placed beneath said presser bar and over said feed dog means when said attachment is attached to said presser bar, to score said workpiece along said pattern lines as said workpiece is advanced by the action of said feed dog means, said presser bar attaching means including:

a. a clamping means, said clamping means having a first, releasing condition and a second, securing condition;
  b. a presser bar receiving channel means connected to said clamping means for freely engaging and disengaging said presser bar when said clamping means is in said first condition and for securing said presser bar in said channel so tightly that said attaching means does not move relative to said presser bar when said glass scoring means is scoring said workpiece and when said feed dog means is advancing said workpiece, when said clamping means is in said second condition;said glass scoring means including a sharp-edged disc of hard material of radius less than the thickness of said workpiece for scoring the upper surface of said workpiece, said disc mounted upon axle means so as to be freely rotated by frictional engagement by said workpiece during advancement by said action of said feed dog means, said disc being free from any connections other than said axle means; and said axle means fixedly connected to said presser bar attaching means.

2. The invention of claim 1, wherein said glass scoring means is removably attached to said presser bar attaching means by glass scoring means attaching means, wherein said glass scoring means attaching means is adapted to receive conventional glass scoring devices.

3. The invention of claim 1, including spring means for exerting bias of said scoring means against said vitreous workpiece and spring attaching means on said presser bar attaching means for attaching one end of said spring means.

4. A vitreous material scoring machine for scoring the upper surface of vitreous material accurately along intricate pattern lines with a glass scoring means comprising:

a. work surface means for supporting said vitreous material, said work surface means having an aperture for feed dog means;
  b. feed dog means operatively connected beneath said work surface means so as to cyclically and repetitively perform the following orbital motion:
    (1) rise up through said aperture means above the plane of said work surface means
    (2) move translationally a short distance
    (3) lower down through said aperture means below the plane of said work surface means
    (4) move translationally the same short distance in the opposite sense to motion (2) to return to original starting position;
  c. presser bar means adapted to hold said glass scoring means against the upper surface of said vitreous material with controlled bias in a first presser bar position and further adapted to hold said glass scoring means high enough above said vitreous material as to permit convenient positioning of said vitreous material in a second presser bar position;
  d. presser bar support means operatively connected to said work surface means and said presser bar means;
  e. power means connected to said feed dog means to drive said feed dog means repetitively through said motion, wherein said motion of said feed dog means causes said vitreous material to be fed beneath said glass scoring means in a plurality of short translations while said vitreous material is also lifted to provide a more controllable scoring action against its said scoring means; wherein said short translatory distance is a fraction of a centimeter.

5. The invention of claim 4, wherein said feed dog means is provided with a resilient upper surface adapted to frictionally grip said vitreous material to enhance feeding action.

6. The invention of claim 4, wherein said presser bar means includes spring means adapted to provide controlled bias of said glass scoring means against the upper surface of said vitreous material.

7. The inventin of claim 4 further including control means connected to said power means, said control means adapted to control the speed of motion of said feed dog means.

8. The invention of claim 4 further including reversing means connected to said power means, said reversing means adapted to controllably reverse the motion of said feed dog means.

9. The invention of claim 4, wherein said glass scoring means includes a sharp point of a material harder than glass.

10. The invention of claim 4, wherein said glass scoring means includes a sharp edged disc of hard material of radius less than the thickness of said workpiece.

11. In the invention of claim 10, said disc mounted so as to be rotated by frictional engagement by said workpiece during advancement by the action of said feed dog.

12. The invention of claim 4, further including orbital motion adjusting means, said orbital motion adjusting means providing means for adjusting the length of each translatory distance and the height to which said feed dog means rises above said work surface means.

13. The invention of claim 4, further including periodic tapping means mounted beneath said work surface means, said work surface means including aperture means for enabling said tapping means to periodically apply a localized striking force to the underside of said workpiece at the scored line to enhance breaking along said scored line.

14. The invention of claim 13, including tapper control means operatively connected to said tapper means to control the periodicity of the application of said striking force relative to the periodicity of said feed dog motions.

15. In the invention of claim 4, said feed dog means including a frictional surface for engaging said workpiece.

16. In the invention of claim 4, said feed dog means including a rotatable upper portion.

* * * * *